US012257497B2

(12) United States Patent
Liu et al.

(10) Patent No.: US 12,257,497 B2
(45) Date of Patent: Mar. 25, 2025

(54) GAMEPAD AND JOYSTICK FEEDBACK FORCE APPARATUS THEREOF

(71) Applicant: GOERTEK INC., Shandong (CN)

(72) Inventors: Zhenzhen Liu, Shandong (CN); Yanlong Liu, Shandong (CN); Xing Zhang, Shandong (CN); Dong Liang, Shandong (CN); Lin Geng, Shandong (CN)

(73) Assignee: GOERTEK INC., Shandong (CN)

( * ) Notice: Subject to any disclaimer, the term of this patent is extended or adjusted under 35 U.S.C. 154(b) by 243 days.

(21) Appl. No.: 17/905,050

(22) PCT Filed: Oct. 31, 2020

(86) PCT No.: PCT/CN2020/125620
§ 371 (c)(1),
(2) Date: Aug. 25, 2022

(87) PCT Pub. No.: WO2021/169374
PCT Pub. Date: Sep. 2, 2021

(65) Prior Publication Data
US 2023/0103669 A1    Apr. 6, 2023

(30) Foreign Application Priority Data

Feb. 28, 2020 (CN) .......................... 202010131170.9

(51) Int. Cl.
*A63F 13/285* (2014.01)
*A63F 13/24* (2014.01)

(52) U.S. Cl.
CPC ............ *A63F 13/285* (2014.09); *A63F 13/24* (2014.09)

(58) Field of Classification Search
CPC .......... A63F 13/20; A63F 13/21; A63F 13/24; A63F 13/285
See application file for complete search history.

(56) References Cited

U.S. PATENT DOCUMENTS

| 5,223,776 A | 6/1993 | Radke et al. |
| 6,429,849 B1 | 8/2002 | An et al. |

(Continued)

FOREIGN PATENT DOCUMENTS

| CN | 2410012 Y | 12/2000 |
| CN | 103186163 A | 7/2013 |

(Continued)

*Primary Examiner* — Omkar A Deodhar
(74) *Attorney, Agent, or Firm* — LKGlobal | Lorenz & Kopf, LLP

(57) ABSTRACT

A gamepad and a joystick feedback force apparatus thereof are disclosed. The joystick feedback force apparatus comprises a joystick that is configured to accept a user's operation and is rotatably installed in a casing of the gamepad. It further comprises a torque output device and a deceleration device. An output shaft of the torque output device is connected with an input end of the deceleration device, an output end of the deceleration device is connected with a rotating shaft of the joystick to apply a torque output by the torque output device to the rotating shaft. When the user operates the joystick to rotate, a certain torque is applied to the rotating shaft after being decelerated by the deceleration device, namely, the corresponding torque is applied to the joystick to form a feedback force to the user.

16 Claims, 2 Drawing Sheets

(56) References Cited

U.S. PATENT DOCUMENTS

| | | | |
|---|---|---|---|
| 2008/0004114 A1 | 1/2008 | McVicar et al. | |
| 2010/0279773 A1* | 11/2010 | Atzmon | A63F 13/06 463/38 |
| 2018/0345134 A1* | 12/2018 | Schmitz | G06F 3/011 |
| 2018/0345137 A1* | 12/2018 | Schmitz | A63F 13/285 |

FOREIGN PATENT DOCUMENTS

| | | |
|---|---|---|
| CN | 106297247 A | 1/2017 |
| CN | 105116961 B | 3/2017 |
| CN | 107632701 A | 1/2018 |
| CN | 107670272 A | 2/2018 |
| CN | 207356544 U | 5/2018 |
| CN | 110052024 A | 7/2019 |
| CN | 110162180 A | 8/2019 |
| CN | 110517925 A | 11/2019 |
| CN | 110705063 A | 1/2020 |
| CN | 110709144 A | 1/2020 |
| CN | 111359202 A | 7/2020 |
| TW | 200417907 A | 9/2004 |

\* cited by examiner

GAMEPAD AND JOYSTICK FEEDBACK FORCE APPARATUS THEREOF

CROSS-REFERENCE TO RELATED APPLICATION

This Application is a U.S. National-Stage entry under 35 U.S.C. § 371 based on International Application No. PCT/CN2020/125620, filed Oct. 31, 2020 which was published under PCT Article 21(2) and which claims priority to Chinese Application No. 202010131170.9, filed Feb. 28, 2020, which are all hereby incorporated herein in their entirety by reference.

TECHNICAL FIELD

This application pertains to the technical field of electronic equipment, more specifically, to a gamepad, and also to a joystick feedback force apparatus of the gamepad.

BACKGROUND

With the development and progress of technology, the popularity of mobile games is increasing, and the requirements for the operation of gamepads are also becoming higher. At present, most gamepads on the market have a joystick, which can rotate in the casing, and users can control the joystick to achieve the corresponding game operation. Please refer to FIG. 1, which is a schematic view of the structure of a joystick in the prior art. The joystick 01 can rotate in the casing 02.

Conventional joysticks mostly return their original position by a spring, which is usually difficult to provide the operator an appropriate feedback force. When operating the joystick, the user needs to feel the action on the joystick by means of the controlled object on the screen, and the hand feel in operation is poor.

In sum, the problems such as how to effectively improve the hand feel in operating the joystick of the gamepad are currently to be solved by those skilled in the art. In addition, other objects, desirable features and characteristics will become apparent from the subsequent summary and detailed description, and the appended claims, taken in conjunction with the accompanying drawings and this background.

SUMMARY

In view of this, a first object of the present disclosure is to provide a joystick feedback force apparatus of a gamepad. The structural design of the joystick feedback force apparatus can effectively solve the problem of poor hand feel in operating the joystick of the gamepad. A second object of the present disclosure is to provide a gamepad comprising the above joystick feedback force apparatus.

In order to achieve the above first object, the present disclosure provides the following technical solutions.

A joystick feedback force apparatus of a gamepad, comprising a joystick that is configured to accept a user's operation and is rotatably installed in a casing of the gamepad, wherein the joystick feedback force apparatus further comprises a torque output device and a deceleration device, an output shaft of the torque output device is connected with an input end of the deceleration device, an output end of the deceleration device is connected with a rotating shaft of the joystick to apply a torque output by the torque output device to the rotating shaft after deceleration to form a feedback force to the joystick.

Preferably, in the joystick feedback force apparatus, the deceleration device comprises a worm gear and a worm, a rotation center of the worm gear is fixedly connected with the rotating shaft, and the worm is fixedly connected with the output shaft of the torque output device.

Preferably, in the joystick feedback force apparatus, the rotation center of the worm gear is provided with a mounting hole, and the rotating shaft is fixedly inserted into the mounting hole.

Preferably, in the joystick feedback force apparatus, the rotating shaft comprises an X-direction rotating shaft and a Y-direction rotating shaft that are perpendicular to each other, the joystick can rotate relative to the casing around an X-direction and a Y-direction respectively, the deceleration device comprises an X-direction deceleration device connected with the X-direction rotating shaft and a Y-direction deceleration device connected with the Y-direction rotating shaft, and the torque output device comprises an X-direction torque output device connected with the X-direction deceleration device and a Y-direction torque output device connected with the Y-direction deceleration device.

Preferably, in the joystick feedback force apparatus, the Y-direction rotating shaft remains stationary when the X-direction rotating shaft rotates relative to the casing, and the X-direction rotating shaft remains stationary when the Y-direction rotating shaft rotates relative to the casing.

Preferably, in the joystick feedback force apparatus, the torque output device is a motor.

Preferably, the joystick feedback force apparatus further comprises a control module that is electrically connected with the torque output device, wherein the control module is configured to control a direction and/or a magnitude of the torque output by the torque output device according to game information.

Preferably, the joystick feedback force apparatus further comprises an adjustment module configured to accept the user's operation and generate a corresponding adjustment signal, wherein the adjustment module is electrically connected with the torque output device, and the torque output device is configured to control a direction and/or a magnitude of the output torque according to the adjustment signal.

Preferably, the joystick feedback force apparatus further comprises a position restoring elastic member that is disposed between the joystick and the casing and configured to return the joystick to its original position.

The joystick feedback force apparatus of the gamepad according to the present disclosure comprises a joystick, a torque output device and a deceleration device. The joystick is installed in the casing of the gamepad and can accept the user's operation and rotate relative to the casing. The output shaft of the torque output device is connected with the input end of the deceleration device, and the output end of the deceleration device is connected with the rotating shaft of the joystick to apply a torque to the rotating shaft to form a feedback force to the joystick.

According to the joystick feedback force apparatus of the gamepad of the present disclosure, when the user operates the joystick to rotate, a certain torque is output from the output shaft of the torque output device and applied to the rotating shaft of the joystick after being decelerated by the deceleration device, namely, the corresponding torque is applied to the joystick to form a feedback force to the user. Therefore, in the process of operating the joystick, the user can not only feel the action on the joystick by means of the controlled object on the screen, but also directly feel the feedback force provided by the joystick itself, and thus obtain a good hand feel in operation. At the same time, the feedback force can be adjusted by adjusting the torque output by the torque output device to meet the different feedback force needs of users. For example, for different users, the feedback force of the joystick can be adjusted conveniently according to their personal habits, which further improves the hand feel in operating the joystick.

In order to achieve the second object, the present disclosure also provides a gamepad comprising any of the above joystick feedback force apparatuses. Since the above joystick feedback force apparatus has the above technical effect, the gamepad having the joystick feedback force apparatus should also have the corresponding technical effect.

BRIEF DESCRIPTION OF DRAWINGS

The present invention will hereinafter be described in conjunction with the following drawing figures, wherein like numerals denote like elements, and.

Figure 1:
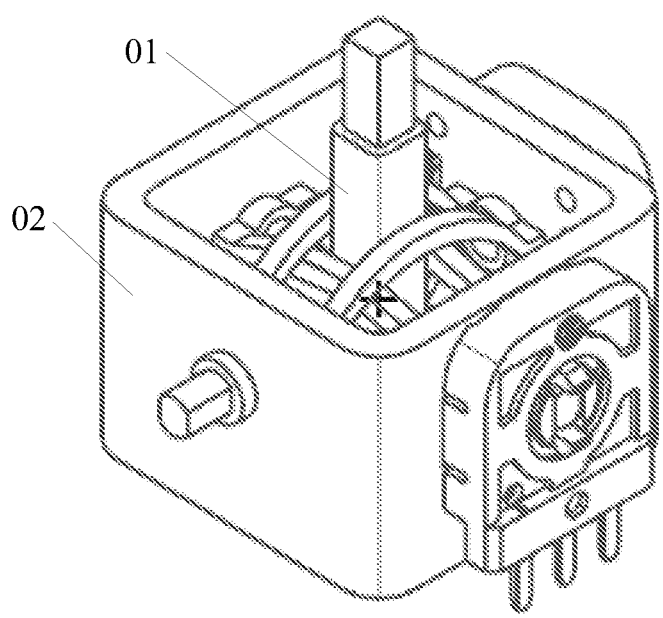
FIG. 1 is a schematic view of the structure of a joystick in the prior art.

In the drawings: joystick 1, casing 2, rotating shaft 3, deceleration device 4, worm gear 41, worm 42, displacement sensor 5.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The embodiments of the present disclosure disclose a joystick feedback force apparatus of a gamepad to improve the hand feel in operating the joystick.

The technical solutions in the embodiments of the present disclosure will be clearly and completely described below in conjunction with the drawings and specific embodiments. Obviously, the embodiments described are only part of, rather than all of, the embodiments of the present disclosure. Based on the embodiments in the present disclosure, all other embodiments obtained by a person of ordinary skill in the art without paying creative work shall fall within the protection scope of the present disclosure.

Figure 2:
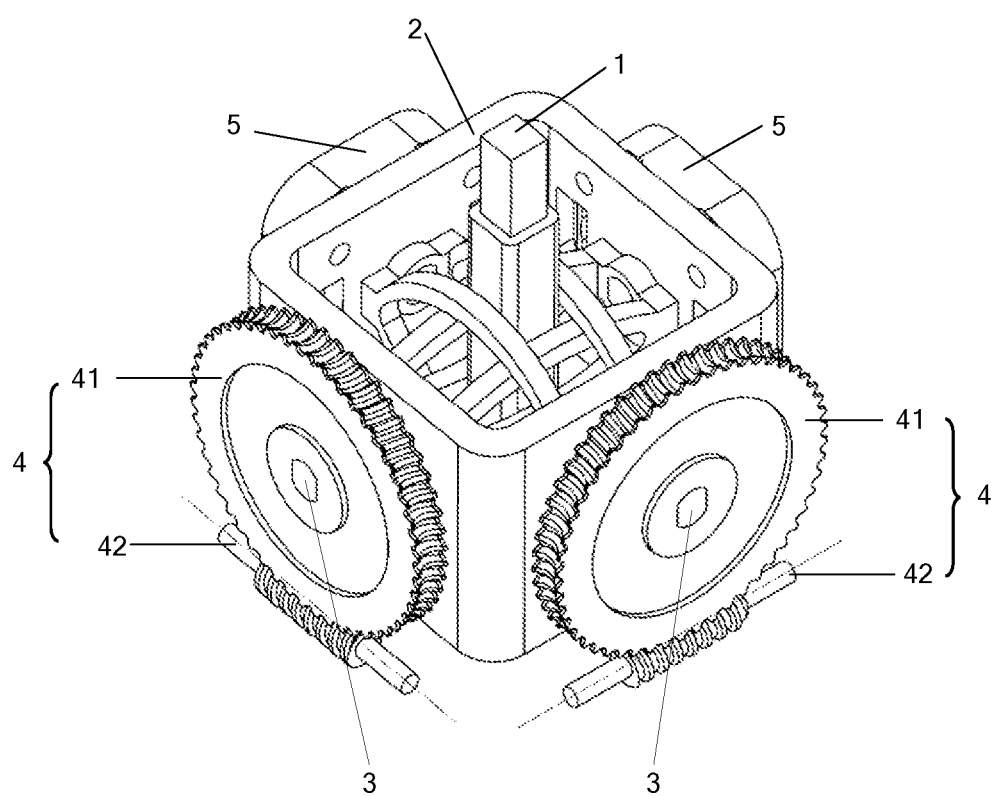
FIG. 2 is a schematic view of the structure of a joystick feedback force apparatus of a gamepad according to a specific embodiment of the present disclosure.

Please refer to FIG. 2, which is a schematic view of the structure of a joystick feedback force apparatus of a gamepad according to a specific embodiment of the present disclosure.

In the specific embodiment, the joystick feedback force apparatus of the joystick according to the present disclosure comprises a joystick 1, a torque output device and a deceleration device 4.

The joystick 1 is installed in a casing 2 of the gamepad, and can accept a user's operation and rotate relative to the casing 2. Namely, the joystick 1 is rotatably installed in the casing 2. Specifically, it can rotate relative to the casing 2 around an X-direction and a Y-direction that are perpendicular to each other. The installation mode of joystick 1 and casing 2 may refer to the prior art and will not be described in detail here. The top end of the joystick 1 generally protrudes from the casing 2 to facilitate accepting the user's operation and swinging along with the user's operation.

The torque output device is installed in the casing 2 and is configured to output a torque. The deceleration device 4 has an input end and an output end. The input end is connected with the torque output device. The rotation of the output shaft of the torque output device is transmitted to the input end of the deceleration device 4 and is output by the output end of the deceleration device 4 after being decelerated. The output end of the deceleration device 4 is connected with a rotating shaft 3 of the joystick 1, so the decelerated torque is applied to the rotating shaft 3 of the joystick 1. The torque output device may be a motor or other conventional equipment that can output a torque. Specifically, the deceleration device 4 may be a gear set for reducing the speed, and other conventional deceleration equipment may also be used as required. When the user rotates the joystick 1, the torque output device outputs a torque and applies it to the joystick 1 after being decelerated by the deceleration device 4, thereby forming a feedback force, i.e., an assisting force or a resisting force to the rotation of the joystick 1, so as to improve the user's hand feel. In addition, since the rotation range of joystick 1 is usually small, and the rotation speed output by the torque output device is usually large, it may be more suitable to the joystick 1 after being decelerated by the deceleration device 4.

According to the joystick feedback force apparatus of the gamepad of the present disclosure, when the user operates the joystick 1 to rotate, a certain torque is output from the output shaft of the torque output device and applied to the rotating shaft 3 of the joystick 1 after being decelerated by the deceleration device 4, namely, the corresponding torque is applied to the joystick 1 to form a feedback force to the user. Therefore, in the process of operating the joystick 1, the user can not only feel the action on the joystick 1 by means of the controlled object on the screen, but also directly feel the feedback force provided by the joystick 1 itself, and thus obtain a good hand feel in operation.

In order to realize the automatic control of the torque output device, a control module may be provided and connected with the torque output device. When the user rotates the joystick 1, the rotation direction of the joystick 1 can be detected by a sensor. For example, by providing a displacement sensor 5, when the user toggles the joystick 1 to generate a displacement, the displacement sensor 5 detects the position change of the joystick 1 and sends a signal to the control module, and the control module controls the torque output device to output a torque.

Specifically, the torque output by the torque output device is adjustable. The "torque is adjustable" mentioned here and below refers to that the magnitude and/or direction of the output torque is adjustable. The "direction is adjustable" means that the torque output device can output clockwise rotation or counterclockwise rotation; the "magnitude is adjustable" means that the magnitude of the torque output by the torque output device is adjustable. The torque output device may specifically comprise a linear motor, and the output torque can be adjusted by adjusting the current passing through the linear motor. For example, when it is necessary to provide an assisting force in the direction consistent with the direction in which the user operates the joystick 1, a current in a certain direction is provided to the linear motor to apply an assisting force. When it is necessary to provide a resisting force in the direction opposite to the direction in which the user operates the joystick 1, a current in a reverse direction is provided to the linear motor to apply a resisting force to the linear motor. When it is necessary to adjust the magnitude of the feedback force (such as an assisting force or a resisting force), the magnitude of the output torque can be adjusted by adjusting the magnitude of the current passing through the linear motor, thereby realizing the adjustment of the magnitude of the feedback force. When a control module is provided, the torque output by the torque output device can be adjusted automatically by the control module. For example, the direction and magnitude of the current passing through the torque output device may be automatically controlled by a circuit, thereby realizing the adjustment of the output torque. If necessary, the direction and magnitude of the current passing through the torque output device may be controlled by manually adjusting the direction and capacity of a power supply externally connected with the torque output device, thereby realizing the adjustment of the output torque. By adjusting the torque output by the torque output device, the feedback force can be adjusted to meet the different feedback force needs of users. For example, for different users, the feedback force of joystick 1 can be adjusted conveniently according to their personal habits, thereby further improving the hand feel in operating the joystick 1.

Further, the deceleration device 4 comprises a worm gear 41 and a worm 42, a rotation center of the worm gear 41 is fixedly connected with a rotating shaft 3 of the joystick 1, and the worm 42 is fixedly connected with the output shaft of the torque output device. Namely, the worm 42 is the input end and the worm gear 41 is the output end. The torque output by the torque output device acts on the worm 42, the worm 42 meshes with the worm gear 41, and then transmits the torque to the worm gear 41, and the worm gear 41 further transmits the torque to the joystick 1. Since the rotation center of the worm gear 41 is fixedly connected with the rotating shaft 3 of the joystick 1, they rotate synchronously. The cooperative transmission ratio of worm gear 41 and worm gear 42 may be set as required to meet the needs of the joystick 1 and the torque output device. For the torque output device with a fast rotation speed, even the worm gear 41 and the worm gear 42 with a small volume can obtain a large transmission ratio and act as the deceleration device, and can smoothly realize the change of rotation direction.

In order to facilitate installation, the rotation center of worm gear 41 is provided with a mounting hole, and the rotating shaft 3 of joystick 1 is fixedly inserted into the mounting hole. Specifically, the rotating shaft 3 of the joystick 1 may be assembled in the mounting hole with an interference fit, and other conventional fixed connection methods may also be used as required.

When the deceleration device 4 is the structure of worm gear 41 and worm 42, since the worm gear 41 and worm 42 have self-locking characteristics, when the torque output device is a linear motor, the self-locking characteristics of worm gear 41 and worm 42 may be used to provide a resisting force to the joystick 1. Specifically, when the user toggles the joystick 1 to one side, if an assisting force is needed, a large current in a certain direction is applied to the linear motor. The rotation direction of the torque generated by the current in this direction and applied to the joystick 1 by the motor 1 is the same as the rotation direction of the joystick 1, so even if the operator applies a small force, the joystick 1 can be toggled, and an assisting force is provided to the joystick 1. When a resisting force is required, a small current is applied to the linear motor, and the self-locking characteristics of worm gear 41 and worm 42 are used to provide a resisting force to joystick 1. At this moment, the operator will feel difficult to toggle the joystick 1. When the user toggles the joystick 1 to the other side, it only needs to change the direction of the current passing through the linear motor correspondingly, that is, a reverse current is applied to the linear motor. In other words, due to the self-locking characteristics of worm gear 41 and worm 42, it does not need to change the direction of the current passing through the linear motor, and the direction of feedback force (i.e., an assisting force or a resisting force) can be adjusted only by changing the magnitude of the current passing through the linear motor. Therefore, the adjustment is more convenient, and the requirement for the structure and performance of the linear motor is lowered.

In the above embodiments, the rotating shaft 3 of the joystick 1 comprises an X-direction rotating shaft and a Y-direction rotating shaft that are perpendicular to each other, and the joystick 1 can rotate relative to the casing 2 around an X-direction and a Y-direction respectively. The deceleration device 4 comprises an X-direction deceleration device connected with the X-direction rotating shaft and a Y-direction deceleration device connected with the Y-direction rotating shaft. The torque output device comprises an X-direction torque output device connected with the X-direction deceleration device and a Y-direction torque output device connected with the Y-direction deceleration device. In other words, the joystick 1 can rotate relative to the casing 2 around the X-direction and the Y-direction; when the joystick 1 rotates relative to the casing 2 around the X-direction, the rotating shaft 3 of the joystick 1 is the X-direction rotating shaft; when the joystick 1 rotates relative to the casing 2 around the Y-direction correspondingly, the rotating shaft 3 of the joystick 1 is the Y-direction rotating shaft. Since the joystick 1 can rotate around different directions, correspondingly, the X-direction torque output device and the X-direction deceleration device, and the Y-direction torque output device and the Y-direction deceleration device are provided corresponding to the X-direction rotating shaft and the Y-direction rotating shaft respectively, so as to provide a feedback force for X-direction rotation and Y-direction rotation of the joystick 1 respectively. If necessary, only the X-direction torque output device and the X-direction deceleration device may be provided or only the Y-direction torque output device and the Y-direction deceleration device may be provided, and the feedback force is only provided in the corresponding direction.

Further, the Y-direction rotating shaft remains stationary when the X-direction rotating shaft rotates relative to the casing 2, and the X-direction rotating shaft remains stationary when the Y-direction rotating shaft rotates relative to the casing 2. In other words, when the joystick 1 rotates around the X-direction, it will not interfere with the Y-direction rotating shaft. Similarly, when the joystick 1 rotates around the Y-direction, it will not interfere with the X-direction rotating shaft. Specifically, it may be achieved through the rotatable installation mode of the joystick 1. The specific installation structure may refer to the rotatable installation mode of the conventional joystick 1 in the prior art, which will not be described in detail here. Of course, when the X-direction rotating shaft rotates relative to the casing 2, if the Y-direction rotating shaft moves along with the X-direction rotating shaft, it only needs to reserve a corresponding movement space in the casing 2 for the Y-direction torque output device and the Y-direction deceleration device; when the Y-direction rotating shaft rotates relative to the casing 2, if the X-direction rotating shaft moves along with the Y-direction rotating shaft, it only needs to reserve a corresponding movement space in the casing 2 for the X-direction torque output device and the X-direction deceleration device.

On the basis of the above embodiments, it further comprises a control module that is electrically connected with the torque output device, and the control module is configured to control a direction and/or a magnitude of the torque output by the torque output device according to the game information. Specifically, the control module generates corresponding control commands according to the game information and controls a direction and/or a magnitude of the torque output by the torque output device. The direction of torque corresponds to the forward or reverse rotation of the output shaft of the torque output device. If necessary, the control module may control the direction of the output torque according to the game information alone, or control the magnitude of the output torque alone, or control the magnitude and direction of the output torque at the same time. By adjusting the magnitude and direction of the torque output by the torque output device, the direction and magnitude of the corresponding feedback force of the joystick 1 are adjusted. Specifically, the control module may be a controller. In sum, by providing the control module, specifically, by combining a digital circuit with game scenes, the magnitude or direction of the torque output by the torque output device can be controlled according to the game information at any time. Specifically, the adjustment of the direction of the output torque can be achieved by controlling the direction and magnitude of the current passing through the torque output device.

Specifically, the control module is configured to control the rotation direction of the torque output to the joystick 1 from the torque output device to be the same as the rotation direction of the joystick 1 in scenes of smooth roads, downhill slopes or skiing, and to control the rotation direction of the torque output to the joystick 1 from the torque output device to be opposite to the rotation direction of the joystick 1 in scenes of wind, rain or hill climbing. Of course, the control mode of the control module corresponding to different game scenes is not limited to the above situations, and can be set according to actual needs of game scenes.

When the user rotates the joystick 1, the rotation direction of joystick 1 can be detected by a sensor. For example, by providing a displacement sensor 5, when the joystick 1 is pushed by the user to generate a small displacement, the displacement sensor 5 detects the position change of the joystick 1 and sends a signal to the control module, and the control module controls the torque output device to output a corresponding torque according to the game information. For example, when an assisting force needs to be output according to the game information, the rotation direction of the torque output from the torque output device to the joystick 1 is the same as the rotation direction of the joystick 1; when a resisting force needs to be output according to the game information, the rotation direction of the torque output from the torque output device to the joystick 1 is opposite to the rotation direction of the joystick 1. Take the case that the torque output device is a motor as an example, when an assisting force needs to be output according to the game information, the control module controls the rotation direction of the motor so that the rotation applied to the joystick 1 shares the same rotation direction with the joystick 1. Specifically, the rotation direction of the motor may be controlled by controlling the direction of the current passing through the motor, that is, by controlling so that a current in a certain direction is applied to the motor; at the same time, the magnitude of the assisting force may be controlled by controlling the magnitude of the current passing through the motor. When a resisting force needs to be output according to the game information, the control module controls the rotation direction of the motor so that the rotation direction of the rotation applied to the joystick 1 is opposite to the rotation direction of the joystick 1. Specifically, the rotation direction of the motor can be controlled by controlling the direction of the current passing through the motor, that is, by controlling so that a reverse current is applied to the motor; at the same time, the magnitude of the resisting force may be controlled by controlling the magnitude of the current passing through the motor. Specifically, the magnitude and the direction of the current input into the motor may be controlled by a program, thereby obtaining different feedback forces in different game scenes and improving the user's game experience.

It can be seen that, by controlling the direction of the torque output by the torque output device according to the game information by the control module, the automatic adjustment of the feedback force of the joystick 1 as an assisting force or a resisting force can be realized, and by controlling the magnitude of the torque output by the torque output device by the control module, the corresponding automatic adjustment of the magnitude of the assisting force or the resisting force can be realized, so that different feedback forces can be obtained in different game scenes and the operator's hand feel can be improved.

In the above embodiments, it further comprises an adjustment module configured to accept the user's operation and generate a corresponding adjustment signal. The adjustment module is electrically connected with the torque output device, and the torque output device is configured to control the direction and/or magnitude of the output torque according to the adjustment signal. That is, by providing the adjustment module to accept the user's adjustment operation and generate a corresponding adjustment signal, the torque output device controls the direction and/or magnitude of the output torque according to the received adjustment signal. Thus, the user can conveniently adjust the magnitude or direction of the feedback force of the joystick 1 according to his own habits to obtain a hand feel suitable to himself.

Specifically, the adjustment module may be electrically connected with the torque output device via a control module, that is, the adjustment module receives the user's adjustment operation and generates a corresponding adjustment signal, and the control module correspondingly adjusts the direction and/or magnitude of the torque output by the torque output device according to the received adjustment signal. The adjustment module may specifically comprise a touch screen to accept the user's adjustment operations such as a touch. Alternatively, the adjustment module may comprise a knob to accept the user's adjustment operations such as rotation. Take the case that the torque output device is a motor as an example, the user may specifically adjust the torque output by the motor by adjusting the magnitude of the current passing through the motor, thereby generating different magnitudes of feedback force to the operator.

In sum, by providing the adjustment module and the control module, in different game scenes, the magnitude and direction of the current can be adjusted at any time by combining the digital circuit with game scenes, and different assisting forces and resisting forces can be applied to the joystick 1 according to the game scenes, thereby obtaining different feedback forces in different game scenes and improving the operator's hand feel. Moreover, players can adjust the magnitude of the feedback force of joystick 1 according to their personal habits to obtain a hand feel suitable to themselves.

In the above embodiments, it further comprises a position restoring elastic member disposed between the joystick 1 and the casing 2 for returning the joystick 1 to its original position. In other words, by providing the position restoring elastic member, when the user releases the joystick 1, the joystick 1 can return to its original position (typically, a center position of swinging) under the action of the position restoring elastic member. Of course, when the position restoring elastic member is provided, the position restoring elastic member itself can also provide a certain feedback force, so the user can adjust the torque output by the torque output device as required, and by combining it with the feedback force of the position restoring elastic member, a comprehensive hand feel suitable to the user can be obtained.

Based on the joystick feedback force apparatus provided in the above embodiments, the present disclosure also provides a gamepad, which comprises any joystick feedback force apparatus in the above embodiments. Since the gamepad adopts the joystick feedback force apparatus in the above embodiments, please refer to the above embodiments for the beneficial effect of the gamepad.

The embodiments in this specification are described in a progressive manner. Each embodiment focuses on the differences from other embodiments. The same and similar parts of the embodiments can be referred to each other.

The above description of the disclosed embodiments enables those skilled in the art to realize or use the present disclosure. Various modifications to these embodiments will be apparent to those skilled in the art, and the general principles defined herein can be implemented in other embodiments without departing from the spirit or scope of the present disclosure. Therefore, the present disclosure will not be limited to the embodiments shown herein, but will conform to the widest scope consistent with the principles and novel features disclosed herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A joystick feedback force apparatus of a gamepad, comprising a joystick (1) that is configured to accept a user's operation and is rotatably installed in a casing (2) of the gamepad,
the joystick feedback force apparatus further comprises a torque output device and a deceleration device (4), an output shaft of the torque output device is connected with an input end of the deceleration device (4), an output end of the deceleration device (4) is connected with a rotating shaft (3) of the joystick (1) to apply a torque output by the torque output device to the rotating shaft (3) after deceleration to form a feedback force to the joystick (1),
wherein the deceleration device (4) comprises a worm gear (41) and a worm (42), a rotation center of the worm gear (41) is fixedly connected with the rotating shaft (3), and the worm (42) is fixedly connected with the output shaft of the torque output device.

2. The joystick feedback force apparatus according to claim 1, wherein a rotation center of the worm gear (41) is provided with a mounting hole, and the rotating shaft (3) is fixedly inserted into the mounting hole.

3. The joystick feedback force apparatus according to claim 1, wherein the rotating shaft (3) comprises an X-direction rotating shaft and a Y-direction rotating shaft that are perpendicular to each other, the joystick can rotate relative to the casing around an X-direction and a Y-direction respectively, the deceleration device (4) comprises an X-direction deceleration device connected with the X-direction rotating shaft and a Y-direction deceleration device connected with the Y-direction rotating shaft, and the torque output device comprises an X-direction torque output device connected with the X-direction deceleration device and a Y-direction torque output device connected with the Y-direction deceleration device.

4. The joystick feedback force apparatus according to claim 3, wherein the Y-direction rotating shaft remains stationary when the X-direction rotating shaft rotates relative to the casing (2), and the X-direction rotating shaft remains stationary when the Y-direction rotating shaft rotates relative to the casing (2).

5. The joystick feedback force apparatus according to claim 1, wherein the torque output device is a motor.

6. The joystick feedback force apparatus according to claim 1, further comprising a control module that is electrically connected with the torque output device, wherein the control module is configured to control a direction and/or a magnitude of the torque output by the torque output device according to game information.

7. The joystick feedback force apparatus according to claim 1, further comprising an adjustment module configured to accept the user's operation and generate a corresponding adjustment signal, wherein the adjustment module is electrically connected with the torque output device, and the torque output device is configured to control a direction and/or a magnitude of the output torque according to the adjustment signal.

8. The joystick feedback force apparatus according to claim 1, further comprising a position restoring elastic member that is disposed between the joystick (1) and the casing (2) and configured to return the joystick (1) to its Original position.

9. A gamepad comprising the joystick feedback force apparatus according to claim 1.

10. The gamepad according to claim 9, wherein a rotation center of the worm gear (41) is provided with a mounting hole, and the rotating shaft (3) is fixedly inserted into the mounting hole.

11. The gamepad according to claim 9, wherein the rotating shaft (3) comprises an X-direction rotating shaft and a Y-direction rotating shaft that are perpendicular to each other, the joystick can rotate relative to the casing around an X-direction and a Y-direction respectively, the deceleration device (4) comprises an X-direction deceleration device connected with the X-direction rotating shaft and a Y-direction deceleration device connected with the Y-direction rotating shaft, and the torque output device comprises an X-direction torque output device connected with the X-direction deceleration device and a Y-direction torque output device connected with the Y-direction deceleration device.

12. The gamepad according to claim 11, wherein the Y-direction rotating shaft remains stationary when the X-direction rotating shaft rotates relative to the casing (2), and the X-direction rotating shaft remains stationary when the Y-direction rotating shaft rotates relative to the casing (2).

13. The gamepad according to claim 9, wherein the torque output device is a motor.

14. The gamepad according to claim 9, further comprising a control module that is electrically connected with the torque output device, wherein the control module is configured to control a direction and/or a magnitude of the torque output by the torque output device according to game information.

15. The gamepad according to claim 9, further comprising an adjustment module configured to accept the user's operation and generate a corresponding adjustment signal, wherein the adjustment module is electrically connected with the torque output device, and the torque output device is configured to control a direction and/or a magnitude of the output torque according to the adjustment signal.

16. The gamepad according to claim 9, further comprising a position restoring elastic member that is disposed between the joystick (1) and the casing (2) and configured to return the joystick (1) to its original position.

\* \* \* \* \*